(12) United States Patent
Liu et al.

(10) Patent No.: US 8,849,509 B2
(45) Date of Patent: Sep. 30, 2014

(54) METHOD AND APPARATUS FOR INTERACTIVE VEHICULAR ADVERTISING

(75) Inventors: Yimin Liu, Ann Arbor, MI (US); Perry Robinson MacNeille, Lathrup Village, MI (US); Julius Marchwicki, Detroit, MI (US); Oleg Yurievitch Gusikhin, West Bloomfield, MI (US); Joseph Carl Beiser, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 29 days.

(21) Appl. No.: 13/473,970

(22) Filed: May 17, 2012

(65) Prior Publication Data

US 2013/0311036 A1 Nov. 21, 2013

(51) Int. Cl.
*G06F 7/00* (2006.01)

(52) U.S. Cl.
USPC .............. 701/36; 701/117; 701/118; 705/1.1; 705/14.4; 705/456.2

(58) Field of Classification Search
USPC .............. 701/36, 533, 49, 469, 23, 408, 532; 705/14.52, 14.62, 14.4, 14.1, 7.33, 1.1; 455/456.2
See application file for complete search history.

(56) References Cited

U.S. PATENT DOCUMENTS

| | | | | |
|---|---|---|---|---|
| 6,526,335 B1 * | 2/2003 | Treyz et al. | | 701/1 |
| 6,711,474 B1 * | 3/2004 | Treyz et al. | | 701/1 |
| 6,882,906 B2 * | 4/2005 | Geisler et al. | | 701/1 |
| 6,892,116 B2 * | 5/2005 | Geisler et al. | | 701/1 |
| 7,856,418 B2 * | 12/2010 | Fernandez | | 707/620 |
| 7,904,465 B2 * | 3/2011 | Fernandez | | 707/754 |
| 7,987,155 B2 * | 7/2011 | Fernandez | | 707/622 |
| 7,996,235 B2 * | 8/2011 | Laghrari et al. | | 705/1.1 |
| 8,055,540 B2 * | 11/2011 | Pudar | | 705/14.62 |
| 8,160,304 B2 * | 4/2012 | Rhoads et al. | | 382/107 |
| 8,255,275 B2 * | 8/2012 | Collopy et al. | | 705/14.49 |
| 8,467,324 B2 * | 6/2013 | Yousefi et al. | | 370/310.2 |
| 8,484,113 B2 * | 7/2013 | Collopy et al. | | 705/35 |
| 8,503,665 B1 * | 8/2013 | Meisel | | 379/266.07 |
| 2002/0098853 A1 * | 7/2002 | Chrumka | | 455/456 |
| 2002/0194483 A1 * | 12/2002 | Wenocur et al. | | 713/185 |
| 2003/0046164 A1 * | 3/2003 | Sato et al. | | 705/14 |
| 2003/0070167 A1 * | 4/2003 | Holtz et al. | | 725/32 |
| 2003/0172376 A1 * | 9/2003 | Coffin, III | | 725/22 |
| 2005/0102074 A1 * | 5/2005 | Kolls | | 701/29 |
| 2005/0231385 A1 * | 10/2005 | Haase | | 340/905 |
| 2006/0074550 A1 * | 4/2006 | Freer et al. | | 701/209 |
| 2007/0032912 A1 * | 2/2007 | Jung et al. | | 701/1 |

(Continued)

OTHER PUBLICATIONS

Ford Motor Company, "SYNC with Navigation System," Owner's Guide Supplement, SYNC System Version 1 (Jul. 2007).

(Continued)

*Primary Examiner* — Thomas G Black
*Assistant Examiner* — Robert Payne
(74) *Attorney, Agent, or Firm* — Jennifer M. Stec; Brooks Kushman P.C.

(57) ABSTRACT

A system includes a processor configured to wirelessly communicate with a remote application. The system also includes one or more outputs, controllable by the processor. The processor is configured to receive an advertisement for playback on at least one output, determine the suitability of the received advertisement for playback, permit or deny advertisement playback based on the suitability of the advertisement, and provide access to the at least one output upon permitting advertisement playback.

12 Claims, 6 Drawing Sheets

(56) References Cited

U.S. PATENT DOCUMENTS

| | | | |
|---|---|---|---|
| 2008/0022203 A1* | 1/2008 | Fernandez | 715/716 |
| 2008/0147253 A1* | 6/2008 | Breed | 701/3 |
| 2008/0228581 A1* | 9/2008 | Yonezaki et al. | 705/14 |
| 2008/0249874 A1* | 10/2008 | Seo | 705/14 |
| 2008/0262660 A1* | 10/2008 | Weber et al. | 701/1 |
| 2008/0274798 A1* | 11/2008 | Walker et al. | 463/25 |
| 2009/0040196 A1* | 2/2009 | Duckstein et al. | 345/204 |
| 2009/0299857 A1* | 12/2009 | Brubaker | 705/14.66 |
| 2010/0002685 A1* | 1/2010 | Shaham et al. | 370/352 |
| 2010/0042498 A1* | 2/2010 | Schalk | 705/14.52 |
| 2010/0131307 A1* | 5/2010 | Collopy et al. | 705/4 |
| 2010/0138298 A1* | 6/2010 | Fitzgerald et al. | 705/14.53 |
| 2011/0040634 A1* | 2/2011 | Landsberry et al. | 705/14.69 |
| 2011/0040707 A1* | 2/2011 | Theisen et al. | 706/12 |
| 2011/0106595 A1* | 5/2011 | Vande Velde | 705/14.4 |
| 2012/0089445 A1* | 4/2012 | Hot | 705/14.4 |
| 2013/0006769 A1* | 1/2013 | Schalk et al. | 705/14.54 |
| 2013/0006775 A1* | 1/2013 | Jordan et al. | 705/14.62 |
| 2013/0132172 A1* | 5/2013 | Liu et al. | 705/14.5 |
| 2013/0157729 A1* | 6/2013 | Tabe | 455/573 |
| 2013/0311036 A1* | 11/2013 | Liu et al. | 701/36 |

OTHER PUBLICATIONS

Ford Motor Company, "SYNC," Owners's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem," Automotive Design & Production, Oct. 2003, http://findarticles.com, pp. 103.

\* cited by examiner

US 8,849,509 B2

METHOD AND APPARATUS FOR INTERACTIVE VEHICULAR ADVERTISING

TECHNICAL FIELD

The illustrative embodiments generally relate to a method and apparatus for interactive vehicular advertising.

BACKGROUND

The competition for advertisement space in the vehicle has become intense. Advertising methods used in printed media have now migrated to online advertising, and will soon be in use in the vehicle. Illustrative vehicle computing systems are capable of communication with the internet through wireless devices. These wireless devices may additionally have applications running thereon, capable of communication with the vehicle computing system.

SUMMARY

In a first illustrative embodiment, a system includes a processor configured to wirelessly communicate with a remote application. The system also includes one or more outputs, controllable by the processor. In this exemplary embodiment, wherein the processor is configured to receive an advertisement for playback on at least one output, determine the suitability of the received advertisement for playback, permit or deny advertisement playback based on the suitability of the advertisement, and provide access to the at least one output upon permitting advertisement playback.

In a second illustrative embodiment, a system includes a processor configured to wirelessly communicate with a remote application and one or more outputs, controllable by the processor. In this embodiment, the processor is configured to receive a first advertisement for playback on at least one output, determine the suitability of the received advertisement for playback, permit or deny advertisement playback based on the suitability of the advertisement, and provide a replacement advertisement upon denying advertisement playback.

In a third illustrative embodiment, a tangible computer-readable storage medium, stores instructions that, when executed by a processor of a vehicle computing system, cause the processor to perform the method including receiving an advertisement for playback on at least one output, determining the suitability of the received advertisement for playback, permitting or denying advertisement playback based on the suitability of the advertisement, and providing access to the at least one output upon permitting advertisement playback.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
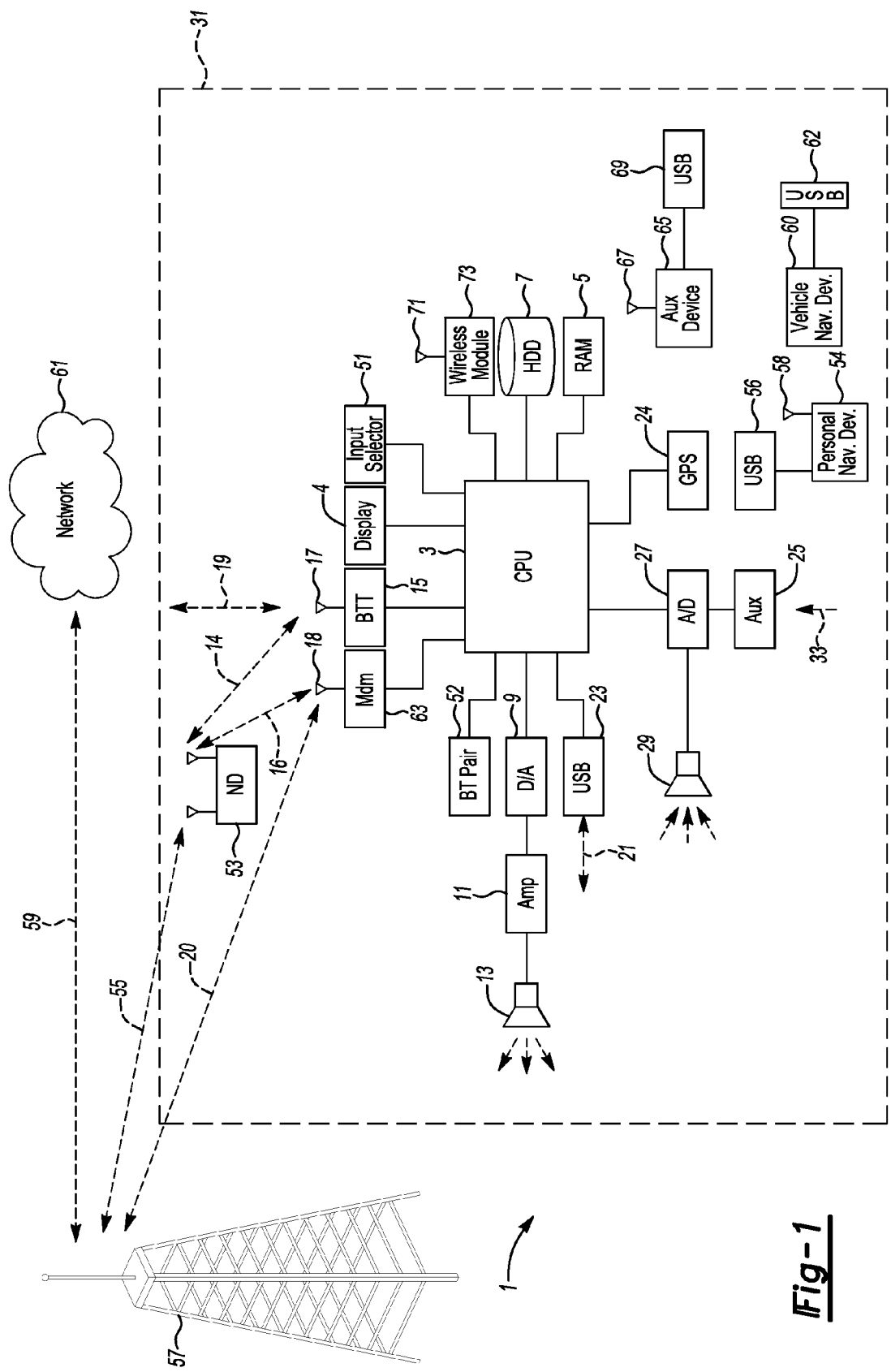
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Applications running on a vehicle, a mobile device (e.g., without limitation, a mobile phone, tablet, PC, smartphone, etc.), or in the cloud may be used to provide advertisements to occupants. Offering coupons in a vehicle, however, may be very different from offering coupons online. Offers may be tailored to minimize or reduce driver distraction. Offers which do not meet acceptable standards may also be prevented in-vehicle playback.

Applications such as, for example, Pandora Radio can be used in conjunction with a vehicle computing system to offer driver-tailored content delivery. These applications often provide advertisements as part of a content stream. The advertisements may be audio, or they may additionally request use of a vehicle display. For example, the advertisers may want to include a coupon with the advertisements. Whether being played over the radio or utilizing the display, certain standards may require that advertisements replicated in vehicles meet requisite levels of driver non-distraction.

Additionally, advertisers benefit when they can deliver advertisements to willing listeners. Advertisements for diapers, for example, are typically wasted on teenagers without children. If an advertiser can be provided with information regarding the people in a vehicle, targeted advertisements can be delivered to the vehicle that would be desirable to the people in the vehicle.

Further, vehicle OEMs may want to either control the type of content played in vehicles, or desire an avenue to monetize content playback over systems the OEMs spent money developing. Filtering advertisements for content or OEM authorization can aid in either of these outcomes. Even if an OEM cannot decide which advertisements an application will select for delivery, the OEM can control which advertisements can be played back over a vehicle system. Ads not approved can either be screened out and swapped for approved ads, or the OEM could actually overwrite those ads with OEM approved and provided ads.

For vehicles equipped with input to vehicle computing systems, OEMs could also provide responsiveness to advertisements. Ads can be skipped, coupons can be requested to be sent to a vehicle or phone, directions to an advertising merchant can be provided, a phone connection to the merchant could be established, etc. Due to the large number of possible vehicle interaction scenarios, many different ways of interacting with advertisements are available.

Input to an advertising interaction system can be physical or verbal, based on available vehicle controls, and, for example, a vehicle state. For example, it may not be possible to use a touch screen to interact with an advertisement while a vehicle is in motion. For this reason, such advertisements may be blocked, or may only be played in an audio fashion. Or they could be replaced by advertisements not seeking to have a user provide touch-screen input.

If an OEM developed a paradigm for permissible advertisements, it is likely that advertisers would begin to tailor ads to meet these requirements, thus aiding the OEM in playing watchdog, and providing advertisements suitable for vehicle delivery under a variety of circumstances.

A mode of communication between occupants and a vehicle may rely on spoken dialog, music, tones, sound locality, visuals at small angles from the direction of the road, ambient lighting, haptic and proprioceptic cues, etc. A massive amount of information about a listener's state can be known in a vehicle. Providing syntactic language feedback can be useful if possible because it can serve to create a more "human" experience for a participant in a human/machine conversation.

Figure 2:
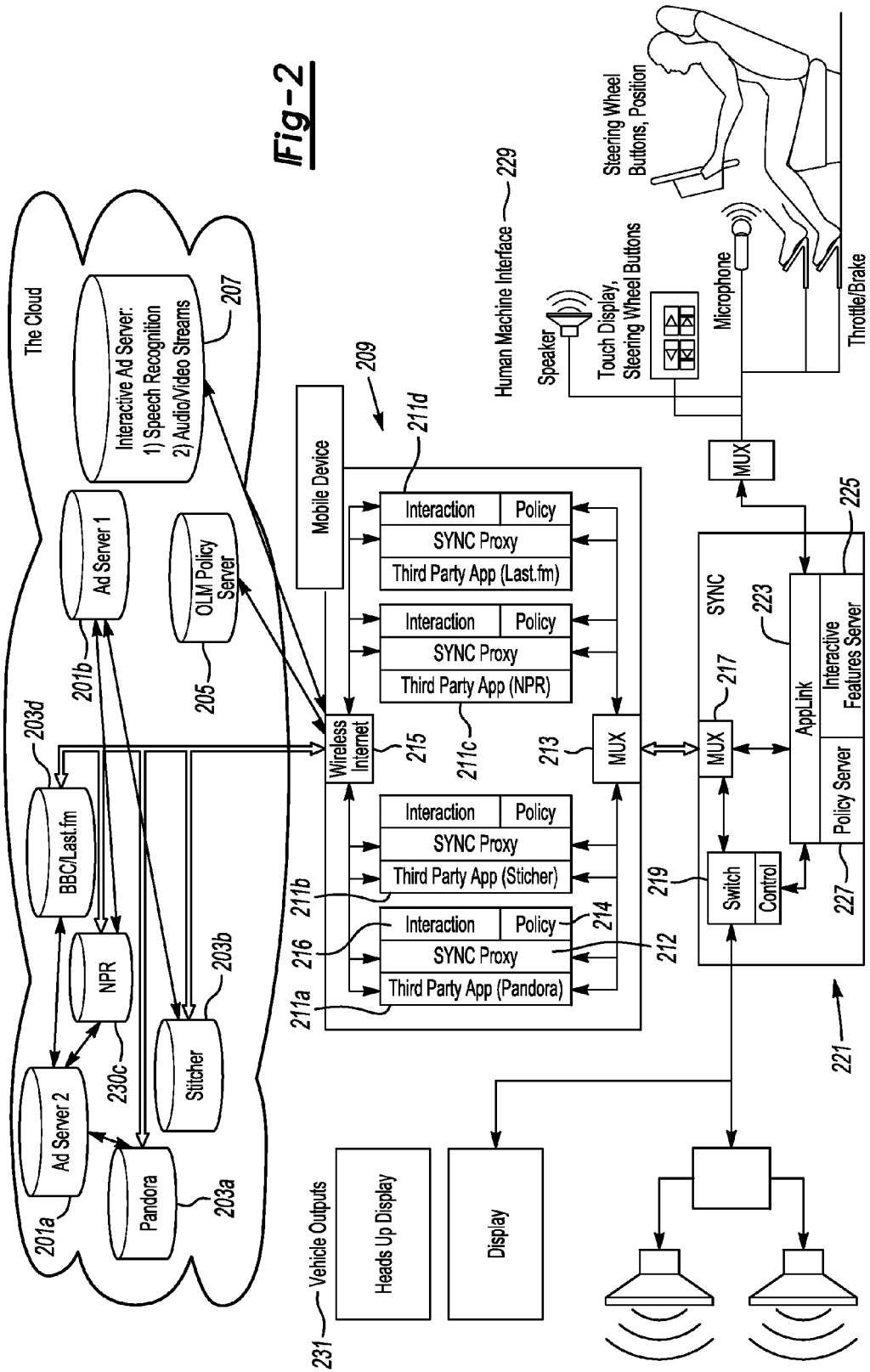
FIG. 2 shows an illustrative example of an advertisement provision system.

FIG. 2 shows an illustrative example of an advertisement provision system. This illustrative system has several main components. In this example, the system is comprised of cloud services, a mobile device 209, and a vehicle computing system 221, including outputs 231 and an HMI 229. Although fairly complex, this is merely an example of a system for practicing the embodiments disclosed herein, and other suitable systems can also be used to practice illustrative embodiments and the like.

In this example, there are a plurality of content services accessible through the cloud. These include, but are not limited to: Pandora 203a, Stitcher 203b, NPR 203c, BBC/Last.fm 203d, etc. In addition to providing user content, these services may provide advertisements as a means to pay for the content provision. Advertisements can come from a variety of locations, including at least one or more advertisement servers 201a, 201b accessible in the cloud. In at least one embodiment, the advertisement servers are provided in conjunction with a vehicle OEM, such that only ads suitable for vehicle delivery are present on the servers. If a device is not sending music to a vehicle for playback, ads may be selected from a different source.

In this example, an additional server may also be available containing interactive ads 207. These ads may include some form of speech recognition (e.g., they may ask the user one or more questions) or they may include video, coupons, or other features requesting access to vehicle inputs and outputs other than an audio system. Due to the interactive nature of these ads, it may not be appropriate to present them to a driver at all times.

Finally, a policy server 205 may be available. This policy server may set conditions as to when ads can occur, what types of ads can be played on a vehicle, what applications can access what features on a vehicle, etc. The server can interact with the applications through the mobile device, but it could also interact with one or more remote services remotely from the mobile device. In other words, the remote services could interact with the policy server to determine suitable ads, permissions, etc., all in a manner that didn't need to involve communication with the vehicle.

All of the data from the remote servers in the cloud, whether it be designated for delivery to the mobile device or eventually the vehicle, can pass to the vehicle through the mobile device, if desired. The mobile device can maintain a connection to the cloud 215, and can run a variety of applications thereon. For example, in this instance, the mobile device has four applications installed thereon, one for Pandora 211a, Stitcher 211b, MPR 211c and Last.fm 211d. Each of these applications, in this example, includes features for connecting to a vehicle computing system 212, for obtaining policies and permissions 214, and for defining user interactions 216.

Outgoing data from applications running on the mobile device can be passed through a multiplexer and sent to the vehicle computing system in a suitable manner. Upon receipt by the vehicle computing system, several things can happen to the data. First, an interface application 223, defining, for example, an API, can be used to process requests from the mobile device. A variety of commands can be provided to this application that allow it to handle requests from a number of mobile applications covering access to various vehicle systems.

In addition to requesting access to VCS resources, such as, but not limited to, graphical displays, sound outputs, heads up displays, etc., the requesting processes may also send information for delivery to these outputs. For example, in the case of Pandora, both advertisements and music may request use of one or more of these outputs. The data for output may be sent to a switch on the VCS 219. Once the data has been approved for processing, a control on the switch may allow the data to pass through to the respective outputs.

Additionally or alternatively, one or more interactive features may be included with an advertisement or stream for delivery. In this example, these features may be controlled by an interactive features server 225. Inputs from an HMI, such as, but not limited to, microphones, buttons, touch displays, etc. may allow input to the interactive features. Also, the interactive feature controller may monitor inputs such as brake pedals, steering, etc., to detect the presence of high driver attention demands (e.g., high traffic, turning, etc.). In scenarios where a good deal of driver attention should be focused on driving, interactive advertisements, for example, can be prevented from display.

Figure 3:
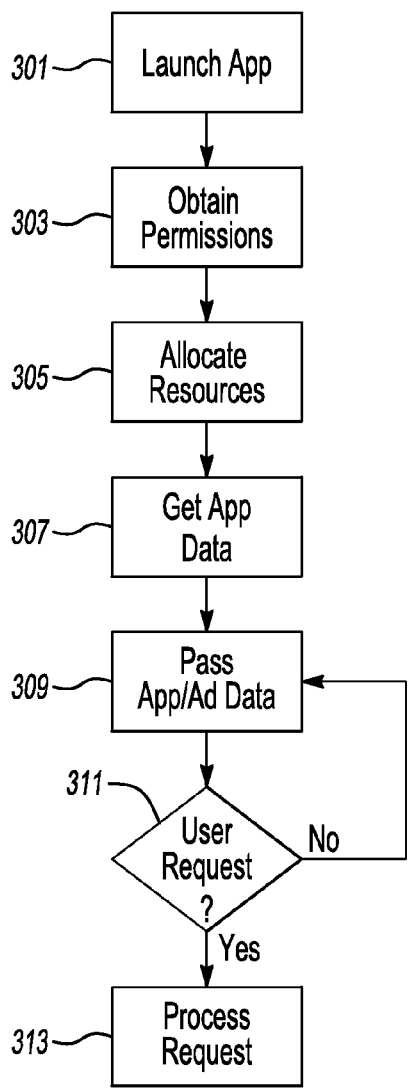
FIG. 3 shows an illustrative example of an advertisement handling process.

FIG. 3 shows an illustrative example of an advertisement handling process. In this example, the process launches an application 301. These applications could include the type of applications previously discussed, or other similar applications designed to interact with the vehicle computing system. Once launched, the applications obtain permissions from a remote server 303, the permissions dictating what features of a vehicle the applications are authorized to access. Resources are then allocated for the running application 305.

Additionally, the application may obtain meta data or other application data 305 to pass to the vehicle computing system 307. In the case of an interactive advertisement, the process may include data relating to a user request. If a user request is input 311, the process will handle the user request 313. Otherwise additional data can be handled appropriately until a user request is input.

Figure 4:
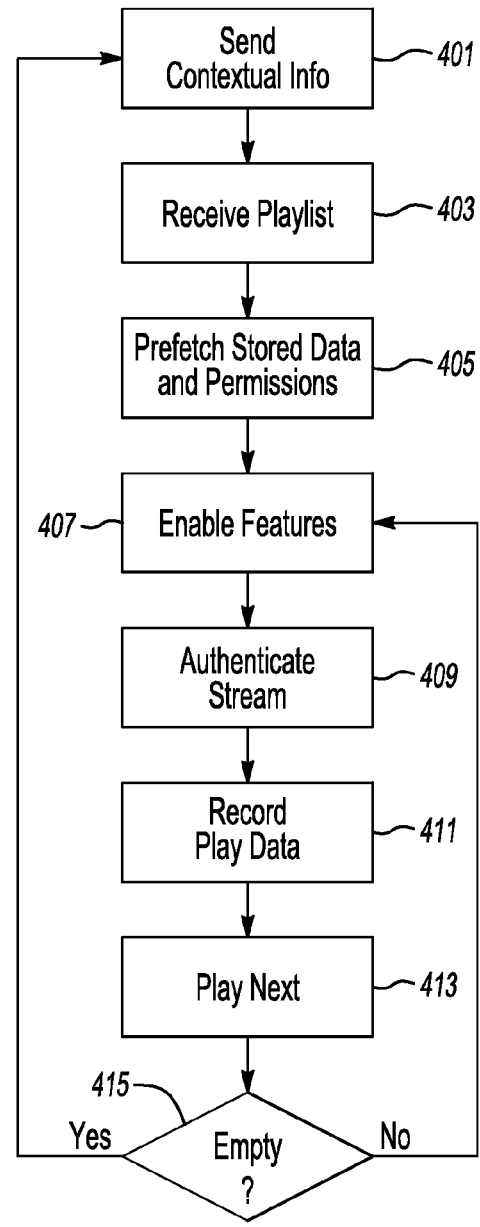
FIG. 4 shows an illustrative example of a stream+ad handling process.

FIG. 4 shows an illustrative example of a stream+ad handling process. In this illustrative example, vehicle contextual information may be used to determine which music and/or advertisements to play 401. Contextual information can include, but is not limited to, passenger identity, time of day, weather, traffic, environmental data, vehicle state data, etc. This information can be passed directly to an application, or to an OEM server which can process the information and send it out to the application.

Once the relevant information has been sent, if needed, the process may then receive a playlist from the application 403. The list can include music, or just be a list setting forth upcoming songs, which may or may not include advertisement breaks as well. Additionally, the application may require permissions to operate in a VCS environment. In this example, the permissions can be prefetched, along with data for one or more upcoming items for playback 405.

Prefetching data may be useful, for example, when an advertisement is interactive in nature. If the advertisement is non-linear (for example, if it changes based on user responses), the process may receive information relating to all the possible choices a user may make. This will help prevent delay based on varying user responses. In addition, certain features of a vehicle computing system may be enabled for a particular application 407, based on permissions granted to that application and the needs of the application. The features may be enabled, for example, based on application requests, or based on the presence of certain meta-data in an incoming stream, which would indicate a need for a particular feature.

In addition to enabling features, an incoming stream may be authenticated to ensure that it is not a counterfeit stream 409. Accounting records for the playback can be logged 411, including, but not limited to, the vehicle on which playback occurred, time of playback, name of artist, track length, etc.

Until the playlist is empty 415, or a trip ends, the process can continue to play a next song in the process 413-recording data, checking stream authenticity, etc. as needed. By repeating certain steps such as stream verification, the system can ensure a counterfeit stream running malicious code has not been interjected. Accounting records for songs can help in both forming an idea of a user's specific preferences and in determining when commercial interruption is appropriate.

Figure 5:
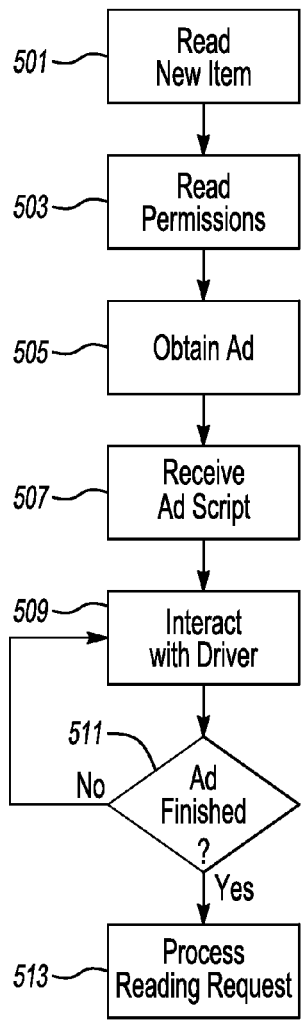
FIG. 5 shows an illustrative example of an interactive advertisement handling process.

FIG. 5 shows an illustrative example of an interactive advertisement handling process. In this illustrative example, the process reads a new item from a playlist 501. In this example, the new item may correspond to an advertisement, which, in this example, is an advertisement with a driver interactive feature (i.e., the driver can respond to the advertisement and affect the upcoming portions of the advertisement based on the driver's responses).

In this non-limiting example, the application also gets permissions associated with an application 503. Some of these permissions may be fixedly assigned to the application (e.g., has the right to use a vehicle display) and some of the permissions may vary based on driver cognitive load (e.g., can only use the display if the driver isn't in a hazardous situation). Once the permissions are obtained, the advertisement can be retrieved from the server (if not already present) 505. Along with the advertisement, a script may be provided 507. Using the script, the ad may speak with a natural or synthetic voice, listen for steering wheel control responses or verbal responses, and change the flow of the ad based on received responses from a driver 509.

Once the ad is finished playing 511, it may be the case that the driver has requested a coupon, more information, or other additional off-line features from the advertisement. Any suitable pending requests can be processed 513.

Figure 6A:
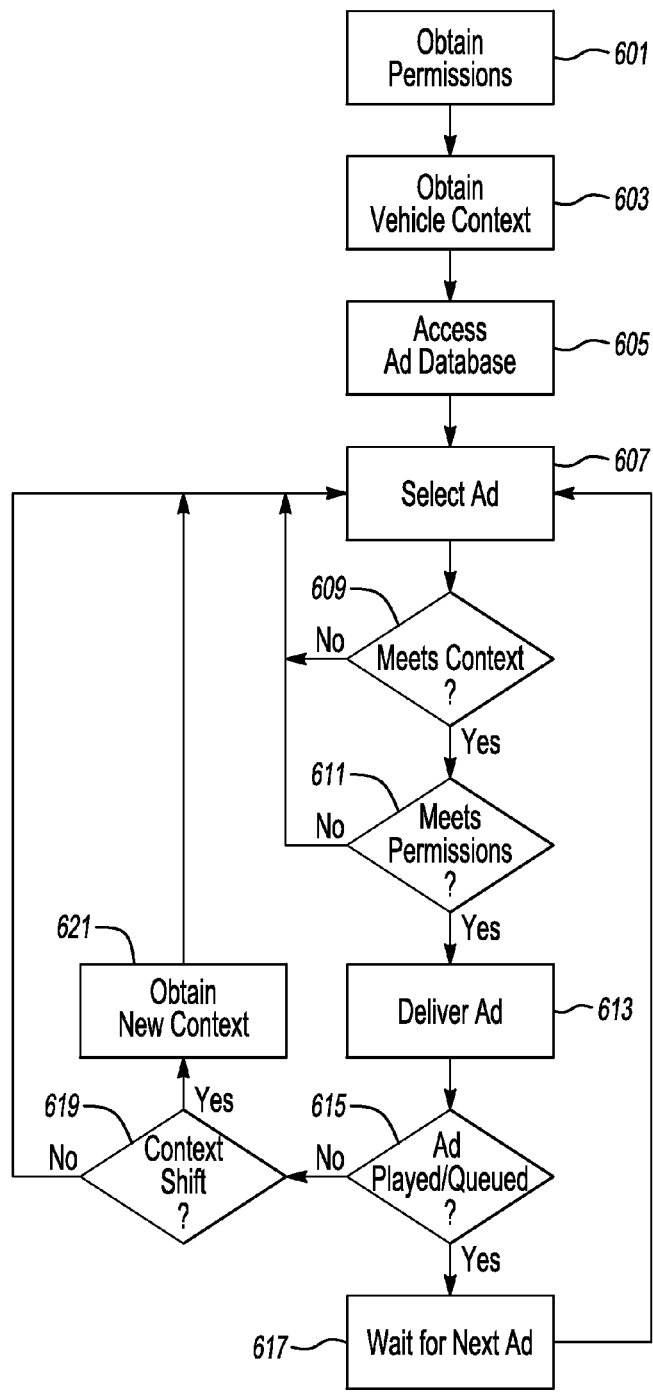
FIG. 6A shows an illustrative example of an advertisement provision process.

FIG. 6A shows an illustrative example of an advertisement provision process. In this illustrative example, the process is running on a mobile device wirelessly connected to a vehicle computing system, but the process could be run on other suitable systems, such as, but not limited to, in the cloud, on a VCS itself, etc. First, the process, which in this example was developed by an outside provider, obtains any needed permissions from an OEM to interact with the vehicle 601. Permissions could also be set, at least to some degree, by a vehicle operator.

Additionally, the process obtains any available vehicle context that could be used to select playlist information or advertisement information or both 603. In this example, the context information is used at least to select advertisements that are relevant to the context (and thus, presumably, driver/occupant appropriate). An ad database is accessed 605, and an advertisement is selected 607.

In this illustrative example, the advertisement is selected and then compared against context, permissions, etc. In other instances, database queries can be used to produce a subset of advertisements meeting the necessary/desired criteria. Once the ad has been selected, the process checks to see if the ad meets current context constraints/recommendations 609. If not, a new ad is selected. If the ad meets context constraints, the process checks to see if the ad meets current permissions as well 611. For example, an ad may meet context but may require use of a vehicle display. If a process is not allowed to access a display on a particular vehicle, the ad may not be suitable for presentation to that vehicle for playback. Again, if the ad does not meet permissions, a new ad is selected.

Once an appropriate ad is selected, the process delivers the ad to the vehicle for playback 613. Feedback is received from the vehicle, indicating whether the ad was successfully played (or queued for playback) 615. In one example, an ad may be permissible in general, but current driver cognitive load variables prevent the ad from immediate playback. In such an instance, the ad may be queued for playback at a time when a driver is less likely to be dangerously distracted by the ad. If the ad has been played, the process will suspend until another ad is needed 617, and then go through the ad selection process again.

If the ad was neither played nor queued, it is likely that a context shift has occurred. In this case, the process will check to see if there is a new context 619 (e.g., without limitation, a new driver, new occupant, etc.). A shift in context may make an ad unacceptable or may set the ads qualifications below a threshold. In such a case, the process may need to obtain a new context 621 for the ad. This new context can be usable in selecting a different, better ad for playback.

Figure 6B:
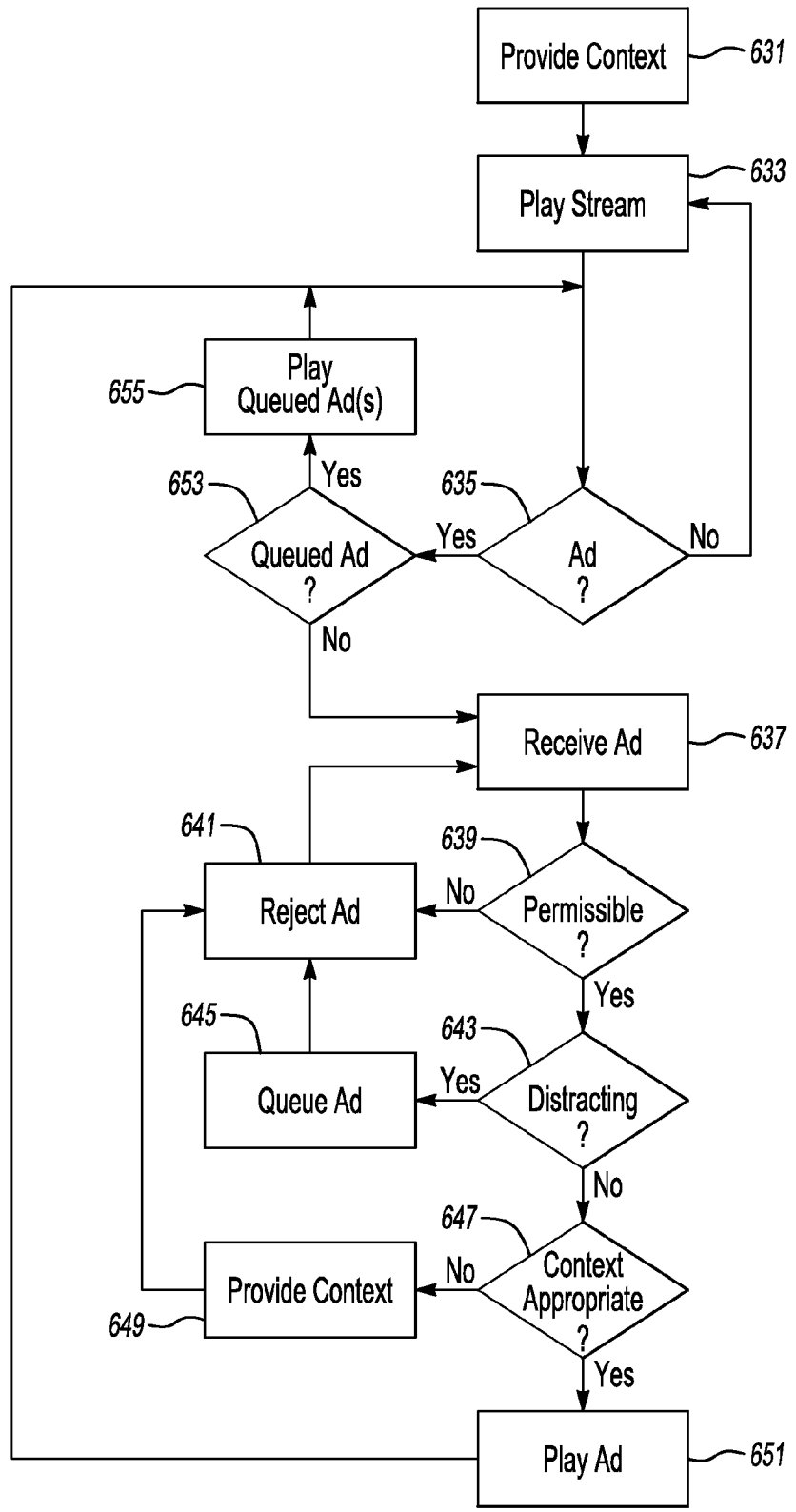
FIG. 6B shows an illustrative example of an advertisement handling process.

FIG. 6B shows an illustrative example of an advertisement handling process. In this illustrative example, the process is running on a vehicle computing system, and handles advertisement playback requests from an application. The process could also be run as a separate application on a mobile device running the ad providing application, or in the cloud, or elsewhere as appropriate.

In response to a context request, the process provides any suitable vehicle context 631. The process may then play any stream provided for the application for playback (as previously discussed), waiting for an ad instance to occur 635. Once an advertisement instance has occurred, the process first checks to see if there are any advertisements queued 653. These advertisements may have been previously queued for playback for a time when driver distraction constraints changed. If there are queued advertisements and the current driver distraction constraints permit playback, those ads may be played back first 655.

If there are no queued advertisements, or if the queued advertisements are unsuitable for current playback, the process will receive an incoming ad for new playback 637. The process checks to see if the advertisement is permitted 639. This could include checking to see if a particular ad is permitted, whether an application has permission to run ads, whether an application has permission to run certain ads, etc. If the ad is not permissible, the ad is rejected 641 and, in this example, the process waits for a new ad.

If the ad is permissible, the process checks to see if the ad is too distracting 643. Based on current weather, time of day, road navigability, traffic, etc., it may be inappropriate to deliver an interactive or distracting advertisement at a current time in a trip. If this is the case, the process may queue the ad for later delivery 645, at a time when a driver is not so distracted.

In this example, once the ad is queued, the process indicates to a remote application that the ad was rejected (or a queue state can be indicated) so that the remote application can provide a replacement ad. It is worth noting that all of the ad selecting and vetting can occur prior to an actual advertisement slot, so that by the time the advertisement slot arrives in the playlist, an appropriate ad has been selected and readied for playback.

If the add is permitted and not distracting, the process may determine if the ad is context appropriate based on a current vehicle context 647. Since vehicle context can be based on a variety of factors that can shift over time, it is possible that an advertisement which was contextually appropriate based on a previous context provided to an application, is no longer appropriate based on a current context. For example, the advertisement may be a beer advertisement, but four children may have entered the vehicle since the previous context was provided to an application.

If the ad is no longer context appropriate, the process may provide the new context 649 (for use in selecting a new ad) and then reject the current ad. If the ad passes all of the checks, it may be played back in a desired manner in the vehicle 651.

Figure 7:
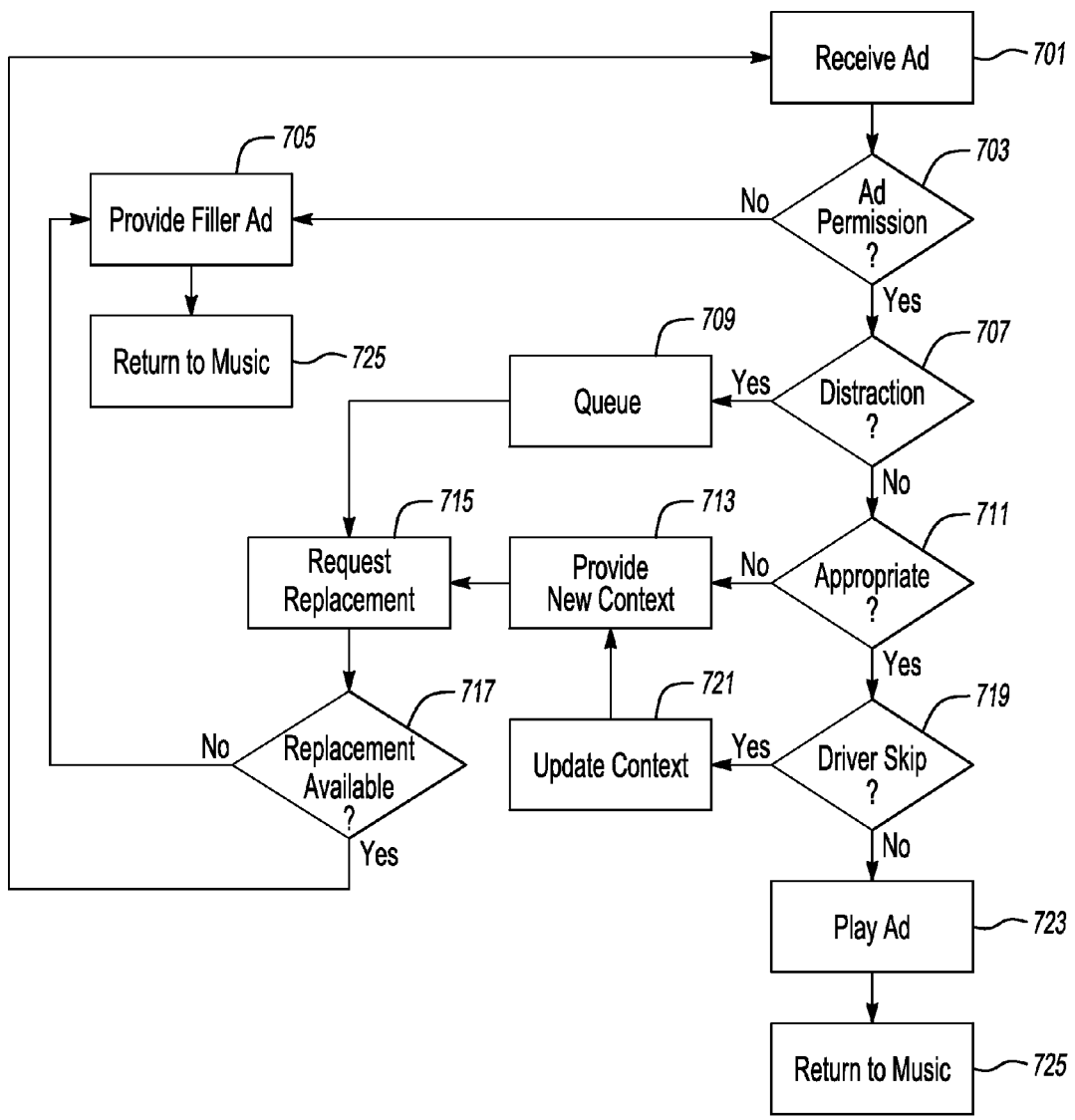
FIG. 7 shows an illustrative example of an advertisement replacement process.

FIG. 7 shows an illustrative example of an advertisement replacement process. This process can be utilized, for example, when no suitable advertisement is available, or, for example, if a particular application does not have permission to run advertisements on a vehicle. In one instance, an application may be desirable for use by a user to playback audio tracks in a vehicle. The application may also include advertisements in an audio stream. If the application developer is unable or unwilling to meet manufacturer requirements for advertisement playback, the app may be permitted to play music in the vehicle but not advertisements. In such an instance, there would be a break in an audio stream while the advertisements were blocked by the vehicle. The manufacturer could interject its own advertisements into the stream.

In another example, the manufacturer could have an agreement with an app provider that the manufacturer would provide the advertisements in a scenario such as above. Revenue could be divided between the two parties, and the manufacturer could provide advertisements suitable for vehicle playback. This could help an app developer to avoid the costs associated with changing a number of advertisements to meet vehicle constraints. Also, this could result in better advertisements, as potentially sensitive vehicle occupant information would not need to be made available to outside parties for advertisement selection.

In this illustrative example, the process receives an ad for playback on a vehicle computing system 701. First, the process checks to see if the advertisement has permission to run on the vehicle computing system 703. This can include a variety of checks. Examples include, but are not limited to, whether the application sending the ad has permission to send ads, whether the ad has any required (if appropriate) header info or meta data associated therewith, whether an advertiser has permission to run the ad, etc. Permissions can be set in several manners by an OEM, for example. Advertisements can be required to include header or meta data, if desired, so ad content can be checked and ads can be checked for appropriateness. Advertisers, either the companies themselves or the advertisement providing apps, can be required to have permission, etc.

If the ad, or app, does not have permission to run/run ads on the vehicle computing system, then, in this illustrative example, the process provides a filler ad from, for example, an OEM ad server 705. In this example, the filler ad allows the OEM to provide advertisements for revenue, while, at the same time, preventing dead air while a prohibited advertisement is blocked. The OEM can also provide an ad that is more targeted towards a user than a blocked ad, increasing user willingness to listen to advertisements.

If the ad/app has the requisite permissions (if any), the process then checks to see if the ad would be overly distracting given a current environmental state. That is, if a process determines that a driver should not be presented with any visual ads, interactive ads, coupon including ads, etc., because a driver's estimated available cognitive load is being occupied by driving related events (or other distractions), the process may block or queue 709 the ad for later playback. In this example, the process queues the ad to be played back later. Since the ad or app had the correct permissions, in this example, the process also asks the app providing the ad for a new advertisement 715 to replace the queued ad.

In this manner, the queued ad can be played at a later time and ad suitable ad can be used to replace the ad. Information relating to an advertisement acceptable projected distraction level may also be included in the request (such as, for example, "only non-interactive audio ads at this time") to ensure that a replacement ad will not also be queued.

If the add is permissible and not distracting, the process checks to see if the ad is appropriate given, for example, a current vehicle context. Since vehicle context is a dynamic thing, it can vary over time as time changes, weather changes, occupants change, traffic changes, etc. Context previously provided to an application may have changed, and a currently served ad (which may have been previously designated for playback at the current time), may no longer fit a context model. In this case, the system will provide the new context to an application/ad server 713 and request a new ad meeting that context 715.

If the add is played, passing all the tests, the process may also check to see if a driver has skipped an ad 719. Although there may be a requirement, by an application provider, that a user listen to one or more ads periodically, in exchange for use of the application, the provider may allow the driver to skip one or more irrelevant ads, in the interest of providing ads that are better suited for the driver. In this example, if the driver skips the ad the current vehicle context is updated 721, indicating that ads that share characteristics of that ad, or ads by that advertiser, or having other suitable features, are given lower priority in the future.

Driver profiles may also be updated, so that, under the current context, ads of this type (or this specific ad) are skipped in the future. Once the context has been updated, a new context is provided to the application/ad server and a replacement advertisement is requested 715.

Once a replacement has been requested, the process checks to see if the app/ad server is capable or is providing a replacement ad 717. If there is no replacement ad available, in the interest of avoiding dead air, the process, in this example, replaces the rejected ad with an OEM selected advertisement. Other suitable steps may also be taken, including, if desired, simply playing dead air.

Once the advertisement (or advertisements) have been completed, the process returns to playing music (or other streamed media) 725.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
 a vehicle-based processor;
 processor-controllable output;
 wherein the processor is configured to:
 wirelessly communicate with a remote software application;
 receive an advertisement from the software application, for playback on at least one output,
 determine suitability of the received advertisement for playback, based on predefined suitability criteria;
 permit or deny advertisement playback based on determined advertisement suitability; and
 provide access to the at least one output upon permitting advertisement playback.

2. The system of claim 1, wherein the suitability criteria includes whether a software application providing the advertisement has permission to provide advertisements.

3. The system of claim 1, wherein the suitability criteria defines OEM required data is associated with the advertisement in order for the advertisement to be played back.

4. A system comprising:
 a vehicle-based processor configured to:
 control at least one vehicle output;
 wirelessly communicate with a remote software application;
 receive a first advertisement for playback on at least one output;
 determine the suitability of the received advertisement for playback, based on predefined suitability criteria;
 permit or deny advertisement playback based on the determined advertisement suitability; and
 provide a suitable replacement advertisement meeting predefined suitability criteria upon denying advertisement playback.

5. The system of claim 4, wherein the providing a replacement advertisement includes requesting a new advertisement from the software application that provided the first advertisement.

6. The system of claim 5, wherein the requesting a new advertisement includes providing a current vehicle context to the software application in conjunction with a new advertisement request.

7. The system of claim 4, wherein the providing a replacement advertisement includes receiving the new advertisement from an OEM provided advertisement database and playing back the new advertisement in place of the first advertisement.

8. The system of claim 4, wherein the processor is further configured to determine if a driver requested skipping of the first advertisement, and wherein the replacement advertisement is provided based on the requested skipping of the first advertisement.

9. A non-transitory computer-readable storage medium, storing instructions that, when executed by a processor of a vehicle computing system, cause the processor to perform the method comprising:
 receiving an advertisement from a remote software application for playback on at least one output,
 determining the suitability of the received advertisement for playback, based on predefined suitability criteria;
 permitting or denying advertisement playback based on the determined advertisement suitability, and
 providing access to the at least one output upon permitting advertisement playback.

10. The storage medium of claim 9, wherein the suitability criteria includes whether the software application providing the advertisement has permission to provide advertisements.

11. The storage medium of claim 10, wherein the criteria for determining whether advertisement content is appropriate is based on a current vehicle context.

12. The storage medium of claim 9, wherein the suitability criteria defines OEM required data to be associated with the advertisement in order for the advertisement to be played back.

\* \* \* \* \*